March 8, 1966  E. E. JOHNSON  3,239,176
SURVEYOR'S LEVEL ROD AND RANGE POLE HOLDER
Filed Sept. 2, 1964
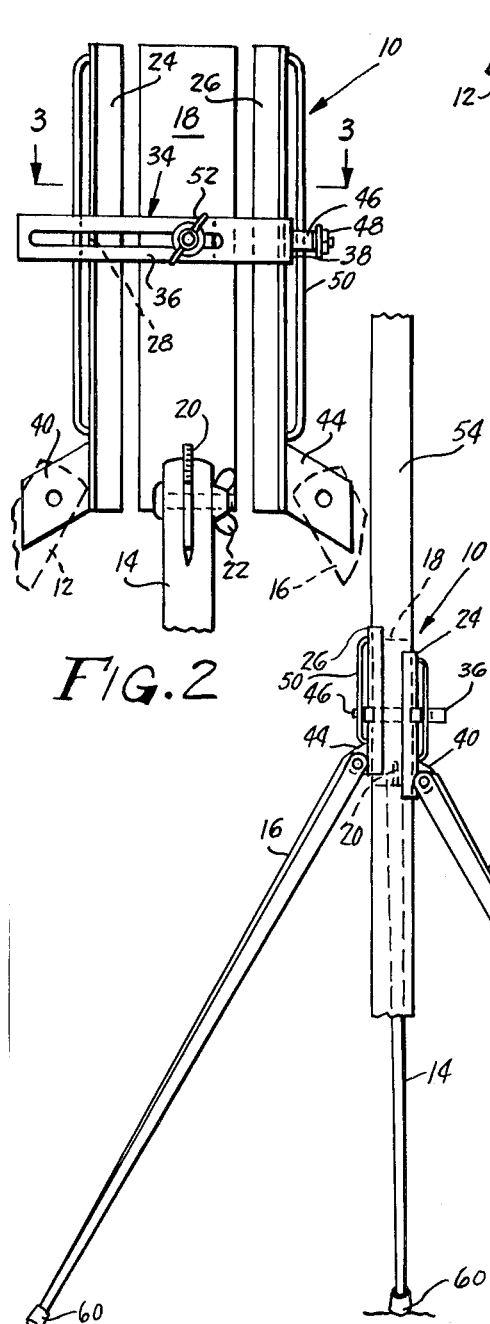
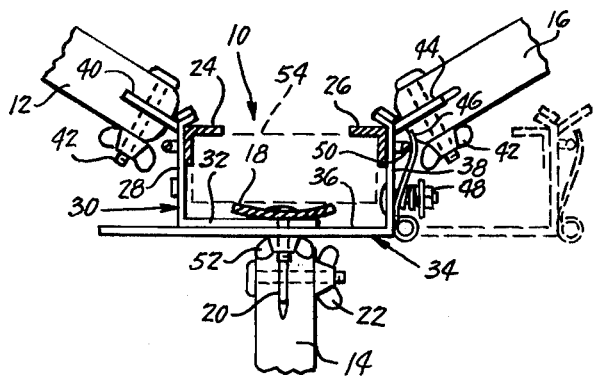
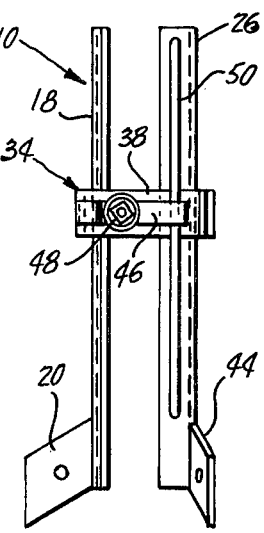
INVENTOR.
EDWARD E. JOHNSON
BY Kimmel & Crowell
ATTORNEYS.

United States Patent Office 3,239,176
Patented Mar. 8, 1966

3,239,176
SURVEYOR'S LEVEL ROD AND RANGE POLE HOLDER
Edward E. Johnson, 1738 W. 2nd St., Hastings, Nebr.
Filed Sept. 2, 1964, Ser. No. 393,897
1 Claim. (Cl. 248—166)

The present invention relates to a holder for a surveyor's level rod or range pole or the like.

Presently in use are level rods and range poles for use as tools of a surveyor in a surveyor's work party. Level rods are most frequently held by hand and moved from place to place but occasionally there is need for a level rod in a particular position for an interval of time which if the rod were held by hand would be a waste of labor. Range poles are generally stuck into the ground and are used by the surveyor for sighting of his surveying instrument or transit. Frequently in conditions of hard ground surfaces it is difficult to erect the range pole and to keep the same erect for the interval of time desired.

An object of the present invention is to provide a compact and foldable holder for a range pole or for a surveyor's level rod, which holder is adapted to hold the pole or rod in a vertical or other position on any sort of ground and without attention thereto.

Another object of the present invention is to provide a holder for a pole or rod which permits reading of the indicia on the rod and permits instant adjustment of the rod within the holder for vertical movement without moving the legs out or in.

A further object of the present invention is to provide a holder for a range pole or surveyor's level rod which is sturdy in construction, one of simple structure, easy to fabricate and assemble, and one which is economically feasible.

These and other objects and advantages of the present invention will be fully apparent from the following description when taken in connection with the annexed drawing, in which:

FIGURE 1 is an elevational view from the front of the holder of the present invention showing a level rod installed therein, FIGURE 2 is a fragmentary view of the holder with portions of the tripod legs broken away, FIGURE 3 is a view taken on the line 3—3 of FIGURE 2, the dotted line showing indicating the surveyor's level rod held thereby, and other dotted lines showing the extensible movement of one of the side members, and FIGURE 4 is a side elevational view of the holder elements removed from the tripod.

With reference to the drawing in detail, the drawing having reference numerals thereon representing identical parts throughout the several views, the holder of the present invention is designated generally by the reference numeral 10 and it includes three tripod legs 12, 14 and 16.

The holder 10 includes an upright backing plate 18 of concave shape as in FIGURE 3 and secured to the upper end of the leg 14 by means of a flange 20 projecting from the lower end of the rear face of the plate 18, as shown most clearly in FIGURE 4.

A conventional wing nut and bolt assembly 22 adjustably secures the flange 20 in the bifurcated upper end portion of the leg 14 in the conventional manner.

A vertically disposed clamping element 24 is positioned adjacent to and spaced from the plate 18 on one side thereof and a second clamping element 26, also vertically disposed, is disposed on the other side of the plate 18 in spaced relation thereto, both of the clamping elements facing inwardly toward the plate 18.

The clamping element 24 is supported on the short leg 28 of an L-shaped strap member 30 which has its long leg 32 adjustably secured to the plate 18.

Another strap member 34 has its long leg 36 adjustably connected to the plate 18 and its short leg 38 carries the clamping element 26 on the free end thereof.

Similar to the flange 20 which projects from the bottom end of the plate 18 is a flange 40 projecting from the lower end of the clamping element 24. The flange 40, best seen in FIGURE 4, is receivable in the bifurcated upper end portion of the leg 12.

Another wing nut and bolt assembly 42 adjustably connects the clamping element 24 to the tripod leg 12.

A similar flange 44 is carried by the lower end of the clamping element 26 and is also received in the bifurcated upper end portion of the tripod leg, in this instance the leg 16.

A similar bolt and nut assembly secures the flange 44 to the leg 16.

A feature of the present invention relates to a spring clip 46 which is secured by nut and bolt assembly 48 to the short leg 38 of the strap member 34. The free end of the spring clip 46 frictionally bears against a vertical strap retaining rod 50 which extends from one end to the other end of the clamping element 26 as shown best in FIGURES 3 and 4.

The plate 18, long leg 32 of the strap member 30 and the long leg 36 of the strap member 34 are secured together by another wing nut and bolt assembly 52 as shown best in FIGURE 3.

In dotted lines at 54 in FIGURES 1 and 3 a surveyor's level rod is shown in the vertical position supported in the device of the present invention.

Obviously with the movable strap member 34 a thinner or wider pole or rod may be embracingly held between the clamping members 24, 26 and the plate 18, the plate 18 being purposely curved and having its curved face facing forwardly so as to partially embrace the edges of a range pole which is usually round in construction.

It will be seen therefore that the adjustability of the strap members 30 and 34 with reference to each other and the adjustability of the clamping member 26 vertically with respect to the strap member 34 permits the vertical adjustment of the clamping members 24 and 26 as shown in FIGURE 1 in order that extremely rough ground or paving be no bar to the properties of the device of the present invention when holding a surveyor's rod in the vertical position with its face indicia visible for the full length of the rod as is obvious in FIGURE 1.

By moving the clamping elements upwardly or downwardly, the rod or pole may be plumbed without moving the tripod legs out or in. When the strap member 34 is shifted to the dotted line position of FIGURE 3, the pole or rod may be inserted through the opening and then clamped in place.

Spring clip 46 by its resilient engagement with rod 50 permits the gradual horizontal movement of pole 54 to permit plumbing the latter.

This holder will fit any factory made leveling rod or range pole, and will hold firmly and plumb on paving, frozen ground, or in the air above the ground.

To attach the rod or pole, the holder is set up as an ordinary tripod, leaving an opening at the side, at the top for inserting rod or pole, and then slides shut on the rod or pole, where it is clamped shut with a wing nut near the top and on back of holder, leaving the face of rod open for easy reading.

To finish plumbing rod or pole, simply slide holders up and down at top of legs, as they may be raised and lowered individually, and it is not necessary to move legs in or out, as with an ordinary tripod to plumb the rod. This is much faster, and accurate. The holder can be moved from point to point clamped to the rod with legs extended, ready to plumb again over another point.

No tool of any kind is required to attach or detach rod from holder. With a little practice this can be done in less than a minute's time, and the sliding action at top of holder moves the rod smoothly over the point to plumb position. The rubber tips 60 on the bottom of the legs, and the wing nuts at the top of the legs will hold firmly and keep the legs from slipping in or out on any smooth surface.

It moves the rod over the point, to a plumb position, the same way as you move the plumb bob on the transit to finish plumbing, only this moves it a much greater horizontal distance.

Preferably, the inside of holders are lined with a soft felt, so as not to scratch the rod or pole while in use.

While only a preferred form of the invention is shown and described, other forms of the invention are contemplated and numerous changes and modifications may be made in the invention without departing from the spirit thereof as set forth in the appended claim.

What is claimed is:

A holder for a surveyor's level rod comprising an upright backing plate, a first strap member of L-shaped cross-sectional configuration disposed adjacent to and on one side of said plate and having a long leg thereof fixedly secured to said plate, a short leg of said strap member projecting outwardly of said plate and being remote from said plate, said short leg having a free end, a second strap member of L-shaped cross-sectional configuration disposed adjacent to and on the other side of said plate, said second member having a long leg adjustably secured to said plate, a short leg of said second member being remote from said plate and having a free end facing said free end of said first member's short leg, a vertically disposed clamp element of right angled cross-sectional configuration carried by the free end of the short leg of said first member, another vertically disposed clamp element of right angled cross-sectional configuration carried by the free end of the short leg of said second member, said clamp elements and said plate being adapted to embracingly engage a portion of a surveyor's level rod for support of the rod in an upright position, and tripod support means connected to said plate and to said first and second members.

References Cited by the Examiner

UNITED STATES PATENTS

| | | | |
|---|---|---|---|
| 1,069,000 | 7/1913 | Giles | 248—226 |
| 2,245,901 | 6/1941 | Chaskin | 33—74 |
| 2,540,769 | 2/1951 | Wattenbarger | 33—74 |
| 2,617,617 | 11/1952 | Krastel et al. | 248—44 |
| 2,747,820 | 5/1956 | Blu | 248—44 |

FOREIGN PATENTS 707,164    4/1954   Great Britain.

CLAUDE A. LE ROY, *Primary Examiner.*